US008882871B2

(12) United States Patent
Tomikawa et al.

(10) Patent No.: US 8,882,871 B2
(45) Date of Patent: Nov. 11, 2014

(54) ALUMINA SINTERED BODY, ABRASIVE GRAINS, AND GRINDSTONE

(75) Inventors: Shinichiro Tomikawa, Shiojiri (JP); Hirokazu Miyazawa, Shiojiri (JP); Takeshi Iemura, Shiojiri (JP)

(73) Assignee: Showa Denko K.K., Tokyo (JP)

( * ) Notice: Subject to any disclaimer, the term of this patent is extended or adjusted under 35 U.S.C. 154(b) by 0 days.

(21) Appl. No.: 13/882,609

(22) PCT Filed: Oct. 18, 2011

(86) PCT No.: PCT/JP2011/073899
§ 371 (c)(1),
(2), (4) Date: Aug. 7, 2013

(87) PCT Pub. No.: WO2012/060212
PCT Pub. Date: May 10, 2012

(65) Prior Publication Data
US 2013/0305616 A1 Nov. 21, 2013

(30) Foreign Application Priority Data
Nov. 1, 2010 (JP) ................. 2010-245581

(51) Int. Cl.
*B24D 3/00* (2006.01)
*B24D 3/14* (2006.01)
*C04B 35/111* (2006.01)
*C04B 35/46* (2006.01)
*C09K 3/14* (2006.01)
*C04B 35/645* (2006.01)
*C04B 35/626* (2006.01)
*B24D 3/06* (2006.01)
*B24D 3/34* (2006.01)

(52) U.S. Cl.
CPC ........... *B24D 3/34* (2013.01); *C04B 2235/3232* (2013.01); *C04B 2235/85* (2013.01); *C04B 2235/3472* (2013.01); *C09K 3/1418* (2013.01); *C04B 2235/3208* (2013.01); *B24D 3/00* (2013.01); *C04B 2235/5436* (2013.01); *C04B 2235/3463* (2013.01); *C04B 2235/3418* (2013.01); *C04B 2235/6022* (2013.01); *C04B 35/645* (2013.01); *C04B 2235/349* (2013.01); *C04B 35/6263* (2013.01); *C04B 2235/6021* (2013.01); *C04B 2235/3217* (2013.01); *C04B 2235/96* (2013.01); *C04B 2235/3272* (2013.01); *C04B 2235/3234* (2013.01); *C04B 35/111* (2013.01); *C04B 2235/3481* (2013.01); *C04B 2235/77* (2013.01); *C04B 35/1115* (2013.01); *B24D 3/06* (2013.01); *C04B 2235/667* (2013.01); *C04B 2235/5445* (2013.01); *C04B 2235/786* (2013.01)
USPC .......................................................... 51/307

(58) Field of Classification Search
CPC ........ C04B 35/111; C04B 35/46; B24D 3/00; B24D 3/14
See application file for complete search history.

(56) References Cited

U.S. PATENT DOCUMENTS 5,035,724 A * 7/1991 Pukari et al. ................. 51/309
5,387,268 A 2/1995 Hiraiwa et al.
(Continued)

FOREIGN PATENT DOCUMENTS

CA 2665044 A1 4/2008
EP 1 538 132 A1 6/2005
(Continued)

OTHER PUBLICATIONS

English abstract of JP 05-163060 dated Jun. 29, 1993.
(Continued)

*Primary Examiner* — Pegah Parvini
(74) *Attorney, Agent, or Firm* — Sughrue Mion, PLLC

(57) ABSTRACT

Provided are an alumina sintered compact containing a titanium compound and an iron compound, wherein $FeTiAlO_5$ grains exist in the grain boundary of the alumina grains and the mean grain size of the $FeTiAlO_5$ grains is from 3.4 to 7.0 μm; and an abrasive grain and a grain stone using the alumina sintered compact.

3 Claims, 3 Drawing Sheets

(56) References Cited

U.S. PATENT DOCUMENTS

| | | | |
|---|---|---|---|
| 5,652,189 A | 7/1997 | Trabelsi | |
| 6,197,248 B1 * | 3/2001 | Fukuda et al. | 264/658 |
| 7,091,146 B2 * | 8/2006 | Okiyama et al. | 501/128 |

FOREIGN PATENT DOCUMENTS

| | | | |
|---|---|---|---|
| GB | 779181 A | 7/1957 |
| JP | 39-4398 B | 4/1964 |
| JP | 39-16592 B | 8/1964 |
| JP | 39-27612 B | 12/1964 |
| JP | 39-27614 B | 12/1964 |
| JP | 52-14993 B | 2/1977 |
| JP | 3-97661 A | 4/1991 |
| JP | 5-301765 A | 11/1993 |
| JP | 8-277160 A | 10/1996 |
| JP | 11-157962 A | 6/1999 |
| JP | 2008-260645 A | 10/2008 |

OTHER PUBLICATIONS

International Search Report for PCT/JP2011/073899 dated Nov. 29, 2011.

Extended European Search Report, dated Apr. 14, 2014, issued by the European Patent Office, in counterpart Application No. 11837863.7.

* cited by examiner (A)  (B)

(A)　　　　　　　　　　　(B)

ALUMINA SINTERED BODY, ABRASIVE GRAINS, AND GRINDSTONE

CROSS REFERENCE TO RELATED APPLICATIONS

This application is a National Stage of International Application No. PCT/JP2011/073899 filed Oct. 18, 2011, claiming priority based on Japanese Patent Application No. 2010-245581 filed Nov. 1, 2010, the contents of all of which are incorporated herein by reference in their entirety.

TECHNICAL FIELD

The present invention relates to an alumina sintered compact, an abrasive grain using the alumina sintered compact, and a grind stone using the abrasive grain.

BACKGROUND ART

An alumina sintered compact is used in various industrial fields, making full use of the excellent characteristics thereof of high hardness, high strength, high heat resistance, high abrasion resistance, high chemical resistance, etc. In particular, it is used as a starting material (abrasive grain) of heavy grinding stones in steel industry.

Special alloys are being much used as a material for parts constituting transportation equipment centered on automobiles or industrial machinery. These special alloys are hard as compared with ordinary SUS304 and others, and heavy grinding stones heretofore unknown and having a high "grinding ratio" are desired by the market. In this, "grinding ratio" is an index of indicating the performance of grind stones and is represented by the following formula:

Grinding Ratio=ground amount of work material (ground amount)/abrasion loss of grind stone In general, it is considered that a grind stone requiring a smaller amount thereof to grind a larger amount of a work material could have better performance; however, the grinding ratio of a grind stone is influenced by the "hardness" and the "fracture toughness" of the abrasive grains used for the grind stone. It is considered that there would be the following relationships between "the grinding ratio and the hardness", and "the grinding ratio and the fracture toughness".
(1) When the hardness of an abrasive grain is high, then the ground amount increases and therefore the grinding ratio becomes high.
(2) When the fracture toughness is high, then the abrasion loss of the abrasive grain reduces and therefore the grinding ratio becomes high.

In consideration of the above (1) and (2), the numerator part in the formula of grinding ratio is influenced by the ground amount, and the denominator part is influenced by the abrasion loss. For increasing the grinding ratio of a grind stone, it is ideal that both the hardness and the fracture toughness thereof are high.

As already-existing abrasive grains for heavy grinding stones, there are known abrasive grains prepared by sintering a fine powder alumina material (for example, see Patent References 1 to 3), molten alumina zirconia abrasive grains (for example, see Patent Reference 4), abrasive grains prepared by adding a crystal grain growth inhibitor such as magnesium oxide or the like to a high-purity fine alumina powder (for example, see Patent Reference 5), etc.

Also proposed is a sintered material comprising aluminium material as the main ingredient and $TiO_2$ added thereto (for example, see Patent Reference 6). Further, as an alumina sintered compact having high hardness and high fracture toughness and excellent in abrasion resistance, proposed is an alumina sintered compact in which a soluble metal compound of Ti, Mg, Fe or the like is added to the alumina crystal (for example, see Patent Reference 7).

CITATION LIST

Patent References

[Patent Reference 1] JP-B 39-4398
[Patent Reference 2] JP-B 39-27612
[Patent Reference 3] JP-B 39-27614
[Patent Reference 4] JP-B 39-16592
[Patent Reference 5] JP-B 52-14993
[Patent Reference 6] JP-A 3-97661
[Patent Reference 7] JP-A 11-157962

SUMMARY OF THE INVENTION

Problems that the Invention is to Solve

However, the abrasive grains in Patent References 1 to 5 all have high hardness but low fracture toughness or have low hardness but high fracture toughness, and these references do not concretely disclose abrasive grains that have high hardness and high fracture toughness. In Patent Reference 6, the hardness of the sintered material is evaluated, but nothing relating to the fracture toughness thereof is taken into consideration therein. Patent Reference 7 discloses, as the alumina sintered compact therein, only a combination of Ti and Mg and a combination of Fe and Mg, but does not concretely disclose any other combination.

Given the situation as above, the present invention has been made and its object is to provide an alumina sintered compact capable of giving abrasive grains having high hardness and excellent in fracture toughness, an abrasive grain using the alumina sintered compact, and a grind stone using the abrasive grain.

Means for Solving the Problems

The present inventors have assiduously studied for the purpose of attaining the above-mentioned object and, as a result, have specifically noted, as the compound to be contained in the alumina sintered compact, a titanium compound (especially titanium oxide) and an iron compound (especially iron oxide), and have found that the $FeAlTiO_5$ grains to be formed of these and alumina exhibit an excellent effect for enhancing the fracture toughness of the alumina sintered compact. The present invention has been completed on the basis of these findings.

Specifically, the present invention is as described below.
[1] An alumina sintered compact containing a titanium compound and an iron compound, wherein $FeAlTiO_5$ grains exist in the grain boundary of the alumina grains and the mean grain size of the $FeAlTiO_5$ grains is from 3.4 to 7.0 μm.
[2] The alumina sintered compact of the above [1], wherein the total amount of the $TiO_2$-equivalent content of the titanium compound and the $Fe_2O_3$-equivalent content of the iron compound is from 5 to 13% by mass.
[3] An abrasive grain comprising the alumina sintered compact of the above [1] or [2].
[4] A grind stone having a layer of the abrasive grains of the above [3] as the working face thereof.

Advantage of the Invention

According to the present invention, there are provided an alumina sintered compact capable of giving abrasive grains having high hardness and excellent in fracture toughness, an abrasive grain using the alumina sintered compact, and a grind stone using the abrasive grain.

MODE FOR CARRYING OUT THE INVENTION

Alumina Sintered Compact

In the alumina sintered compact of the present invention, there exists a crystal phase of a composite metal oxide containing Ti, Fe and Al, concretely FeAlTiO$_5$ grains in the grain boundary of the main crystal phase composed of a corundum crystal. The existence of the FeTiAlO$_5$ grains provides the alumina sintered compact that gives abrasive grains having high hardness and excellent in fracture toughness. In particular, owing to the effect of the FeTiAlO$_5$ grains having higher fracture toughness than a corundum phase, there can be obtained an alumina sintered compact having high hardness and excellent fracture toughness. The mean grain size of the FeAlTiO$_5$ grains can be confirmed according to the method described in Examples to be given below.

The mean grain size of the crystal phase of the composite metal oxide with Ti, Fe and Al (FeTiAlO$_5$ grains) is indispensably from 3.4 to 7.0 μm, but preferably from 3.7 to 6.5 μm, from the viewpoint of increasing the fracture toughness.

Falling outside the range of from 3.4 to 7.0 μm, the grains could not be effective for preventing the growth of the cracks formed by fracture. On the contrary, falling within the range of from 3.4 to 7.0 μm, the crack deviation effect of the FeTiAlO$_5$ grains can be secured well.

Here the mechanism that could provide the above-mentioned effect is described below.

Figure 3:
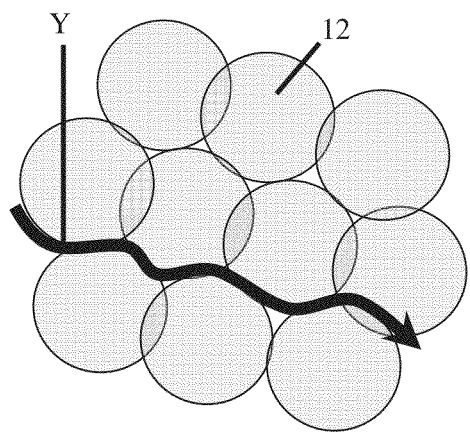
FIG. 3 This is an action explanatory view of explaining the mode of impact propagation to a sintered compact of alumina alone.
Figure 4:
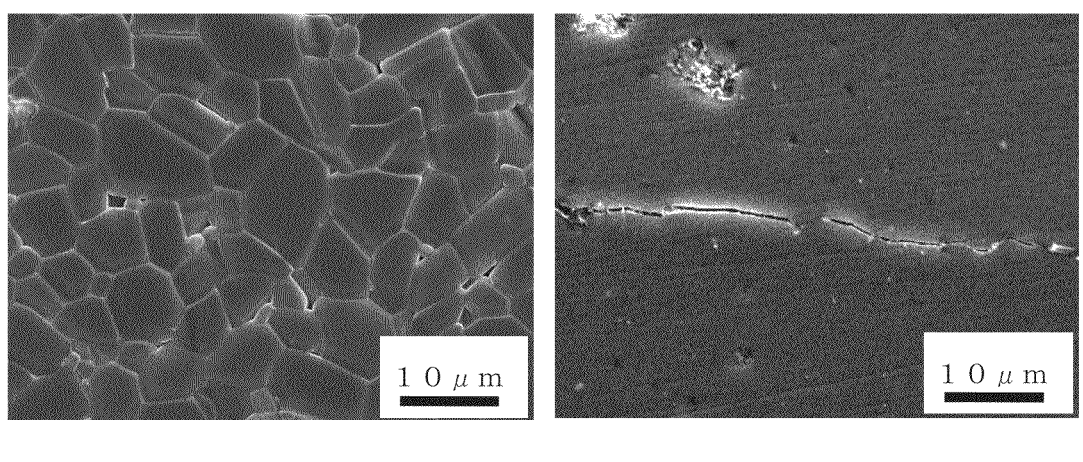
FIG. 4 This shows SEM pictures of the sintered compact of alumina alone before and after impact test thereof; (A) shows the condition of the crystalline structure before impact test (processed by thermal etching); (B) shows the condition of crack propagation after impact test (not processed by thermal etching).

First, in a sintered compact of alumina alone, the crack propagation runs in the direction of the arrow Y along the grain boundary of the alumina grains 12, as shown in FIG. 3. With that, depending on the impact level, a linear crack may form along the grain boundary, as shown in the SEM picture of FIG. 4(B). FIG. 4 shows SEM pictures of the sintered compact of Comparative Example 1 to be mentioned below; and FIG. 4(A) shows the condition of the crystalline structure before given impact, and FIG. 4(B) shows the condition of crack propagation after given impact.

Figure 1:
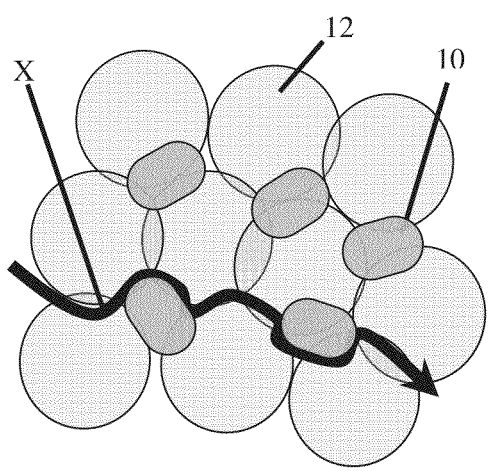
FIG. 1 This is an action explanatory view of explaining the mode of impact propagation to the alumina sintered compact of the present invention.

On the other hand, incorporation of a titanium compound and an iron compound provides a crystal phase of a composite metal oxide having a high fracture toughness value (FeTiAlO$_5$ grains 10) in the grain boundary of the alumina grains 12, as shown in FIG. 1. The FeTiAlO$_5$ grains 10 thus exist in the grain boundary of the alumina grains 12, and therefore, even though the crack formed by impact application grows further, the crack could be deviated so as to go by a roundabout route in the direction of the arrow X from the starting point of the grain 10, and consequently, the impact force is not in one direction but diffuses and is thereby relaxed. Accordingly, it is considered that the fracture toughness value would be high as a whole.

Figure 2:
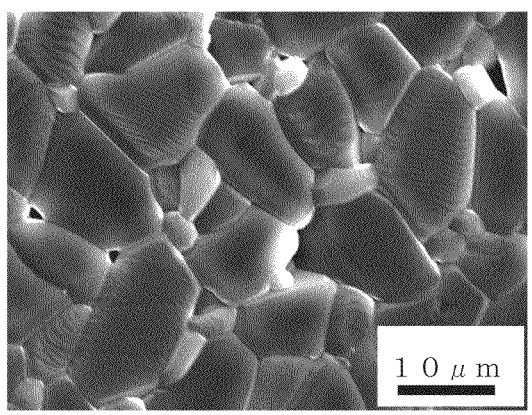
FIG. 2 This shows SEM pictures of the alumina sintered compact of the present invention before and after impact test thereof; (A) shows the condition of the crystalline structure before impact test (processed by thermal etching); (B) shows the condition of crack propagation after impact test (not processed by thermal etching).
Figure 2:
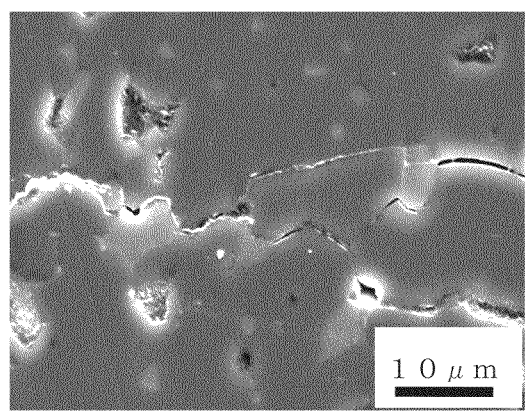

This is known from the SEM pictures of FIG. 2 indicating the results of impact test. Specifically, when impact is given in the condition where the FeTiAlO$_5$ grains exist in the grain boundary of the alumina grains, as in the SEM picture of FIG. 2 (A), then the crack starting from the FeTiAlO$_5$ grains may go around the grains, as in FIG. 2(B).

FIG. 2 shows SEM pictures of the sintered compact of Example 3 to be mentioned below, in which the gray part (tinted part) positioned in the triple point existing in the grain boundary of the alumina grains corresponds to the FeTiAlO$_5$ grain.

The alumina sintered compact of the present invention contains a titanium compound and an iron compound, wherein the total amount of the three ingredients of the TiO$_2$-equivalent content of the titanium compound (hereinafter this may be referred to as "TiO$_2$-equivalent content"), the Fe$_2$O$_3$-equivalent content of the iron compound (hereinafter this may be referred to as "Fe$_2$O$_3$-equivalent content") and the alumina content is preferably at least 98% by mass.

Also preferably, the total amount of the two ingredients of the TiO$_2$-equivalent content and the Fe$_2$O$_3$-equivalent content is from 5 to 13% by mass, more preferably from 7 to 10% by mass.

In the alumina sintered compact of the present invention, the ratio by mass of the TiO$_2$-equivalent content to the Fe$_2$O$_3$-equivalent content (TiO$_2$:Fe$_2$O$_3$) is preferably from 0.85:1.15 to 1.15:0.85, more preferably from 0.90:1.10 to 1.10:0.90, even more preferably from 0.95:1.05 to 1.05:0.95, in order that the sintered compact can have high hardness and high fracture toughness.

Regarding the relationship between the total amount of the two ingredients of the TiO$_2$-equivalent content and the Fe$_2$O$_3$-equivalent content, and the hardness, when the total amount is larger, then the hardness is lower; however, in case where the total amount of the two ingredients falls within the range defined in the present invention, then the mean Vickers hardness that is an index of hardness is, for example, at least 16 GPa, therefore indicating the presence of a practically excellent hardness.

On the other hand, the relationship between the total amount of the two ingredients and the fracture toughness is not like the relationship to the hardness as above; however, the present inventors have found that, within a specific range of the total amount of the two ingredients, the fracture toughness is extremely high. Specifically, when the total amount of the two ingredients falls within the range defined in the present invention, then the fracture toughness value may be, for example, at least 3.0 MPa·m$^{1/2}$.

As described in the production method for an alumina sintered compact to be mentioned below, use of ilmenite (titanic iron: $FeTiO_3$) as the starting material containing Ti and Fe is preferred from the viewpoint of the production cost.

Preferably, the alumina sintered compact of the present invention contains a silicon compound and/or a calcium compound that are other metal compounds than $TiO_2$, $Fe_2O_3$ and $Al_2O_3$, in order that the sintered compact could have higher fracture toughness.

Preferably, the total amount of the $SiO_2$-equivalent content of the silicon compound (hereinafter this may be referred to as "$SiO_2$-equivalent content") and the CaO-equivalent content of the calcium compound (hereinafter this may be referred to as "CaO-equivalent content") is at most 2% by mass, more preferably from 0.5 to 2% by mass.

The silicon compound and the calcium compound act as a grain growing agent, and it is considered that the presence of at most 2% by mass, as their oxides, of these compounds would unhomogenize the shape and the size of the alumina corundum grains therefore causing deviation of cracks. Specifically, it is considered that, owing to the existence of a specific amount of a titanium compound and an iron compound and a specific amount of a silicon compound and a calcium compound, the respective effects could be combined therefore efficiently providing deviation of cracks and attaining the effect of further increasing the fracture toughness.

Here the alumina content, the $TiO_2$-equivalent content, the $Fe_2O_3$-equivalent content, the $SiO_2$-equivalent content, the CaO-equivalent content and the metal oxide-equivalent content of other metal compounds are determined according to a fluorescent X-ray elementary analysis method. Concretely, they are determined as follows.

First, for the measurement, a standard oxide sample of which the elementary composition is known is analyzed in wet. With the thus-found, wet analysis data taken as the standard values, calibration curves necessary for measurement are formed. The quantitative analysis of the samples is carried out on the basis of the thus-formed calibration curves. As the measurement apparatus, usable is Panalytical's "PW2400 Model". For the measurement, preferably, the condition is such that the tube is a rhodium tube is used and the characteristic X ray is a $K\alpha$ ray. Preferably, in the measurement, the tube voltage and the tube current are varied for the individual elements. Examples of the conditions of the tube voltage and the tube current are shown in Table 1 below.

In this specification, the entire amount to be the denominator in determining the individual metal oxide-equivalent content is the total amount of all the metal elements, as their oxides, contained in the alumina sintered compact.

TABLE 1

Tube Voltage and Tube Current for Each Metal Oxide

| Element | Tube Voltage [kV] | Tube Current [mA] |
| --- | --- | --- |
| Al | 24 | 120 |
| Fe | 60 | 48 |
| Ti | 40 | 72 |
| Si | 24 | 120 |
| Ca | 40 | 72 |

[Method for Producing Alumina Sintered Compact]

Next described is a method for producing the above-mentioned alumina sintered compact of the present invention.
(Starting Material)

In the method for producing the alumina sintered compact of the present invention, an alumina, a titanium compound and an iron compound are used as the starting materials. If desired, a silicon compound and/or a calcium compound may be further used. These may be in the form of a composite oxide containing two or more of them.

Regarding the form of the starting material, there are mentioned a powder, a metal powder, a slurry, an aqueous solution, etc. In the present invention, preferably, the starting materials are in the form of powder from the viewpoint of easiness in handling them in operation. In case where powdery starting materials are used, the cumulative mass 50% diameter ($d_{50}$) of the alumina powder, the titanium compound powder, the iron compound powder, the silicon compound powder and the calcium compound powder is preferably at most 3 μm each, more preferably at most 1 μm for obtaining a homogenous mixed powder.

Here, the cumulative mass 50% diameter ($d_{50}$) of the powders can be determined according to a laser diffraction method.

The alumina powder is the starting material for forming the main crystal phase of a corundum crystal in the alumina sintered compact to be obtained, and is therefore preferably a high-purity one, and for example, preferred is use of alumina or the like formed according to a Bayer process.

The titanium compound powder and the iron compound powder may be a high-purity $TiO_2$ powder and a high-purity $Fe_2O_3$ powder, respectively, or may also be in the form of a composite oxide of all or two of titanium, iron and alumina. The composite oxide includes ilmenite (titanic iron: $FeTiO_3$) powder, aluminium titanate powder, $FeTiAlO_5$ powder, etc. The ilmenite powder is more inexpensive than high-purity $TiO_2$ powder and high-purity $Fe_2O_3$ powder, and therefore can lower the production cost of abrasive grains. Accordingly, use of ilmenite powder is preferred.

Here ilmenite is also called titanic iron, and a naturally-occurring iron and titanium oxide mineral, and its composition is expressed as $FeTiO_3$. The locality includes Australia, Norway, Russian Ural region, India, Canada, America, Malaysia, etc., and the chemical composition varies depending on the locality. There exist derivatives of $FeTiO_3$ in which $Fe^{2+}$ is partly substituted with $Mg^{2+}$.

The chemical composition of the alumina ingredient of the ingredients constituting ilmenite (from Queensland in Australia), and the oxide-equivalent content of iron compound, titanium compound, silicon compound and calcium compound are shown in Table 2 below.

TABLE 2

Content of Alumina and Oxide-Equivalent Ingredients in Ilmenite (% by mass)

| $Al_2O_3$ | $Fe_2O_3$ | $TiO_2$ | $SiO_2$ | CaO |
| --- | --- | --- | --- | --- |
| 0.43 | 46.93 | 49.10 | 0.35 | 0.02 |

In case where an ilmenite powder is used, the blend ratio by mass of the ilmenite powder to the alumina powder (ilmenite powder:alumina powder) is preferably from 0.05:0.95 to 0.16:0.84, more preferably from 0.08:0.92 to 0.12:0.88. When the blend ratio by mass is from 0.05:0.95 to 0.16:0.84, then the total amount of the two ingredients of the $TiO_2$-equivalent content and the $Fe_2O_3$-equivalent could be from 5 to 13% by mass.

In case where a silicon compound and a calcium compound are used, the $SiO_2$-equivalent content of the silicon compound and the CaO-equivalent content of the calcium compound are so controlled as to be at most 2% by mass in total, preferably from 0.5 to 2% by mass. Using these can further increase the fracture toughness value.

The silicon compound powder and the calcium compound powder may be a high-purity $SiO_2$ powder and a high-purity CaO powder, calcium carbonate powder or the like, respectively; or may also be in the form of a composite oxide of all or two of silica, calcium oxide and alumina. As the composite oxide, there are mentioned powders of mullite, zeolite, bentonite, gehlenite, anorthite, etc.

(Preparation of Mixture)

In the method for producing the alumina sintered compact of the present invention, the method of preparing the starting material mixture is not specifically defined. For example, the following method is preferably employed here.

First, an alumina powder prepared according to a Bayer process and an ilmenite powder (or $TiO_2$ powder and $Fe_2O_3$ powder) each in a predetermined amount are added to an aqueous medium containing polyvinyl alcohol. Subsequently, for example, using an ultrasonic disperser, a media-assisted disperser such as a planetary ball mill, a ball mill, a sand mill or the like, or a medialess disperser such as Altimizer (trade name), Nanomizer (trade name) or the like, a homogeneous slurry is obtained. Next, the slurry is dried and then ground to prepare a mixture (powder) having a cumulative mass 50% diameter ($d_{50}$) of at most 3 μm, preferably at most 1 μm.

(Sintering of Mixture)

A shaped compact of the starting material mixture prepared in the manner as above is sintered to give the alumina sintered compact of the present invention having a relative density of at least 95%, preferably at least 97%. Having a relative density of at least 95%, reduction in the hardness and the fracture toughness of the sintered compact to be caused by the pores and voids in the sintered compact can be prevented. The relative density can be computed by dividing the bulk density of the sintered compact, as measured according to an Archimedian method, by the true density thereof.

In sintering, the mixture is shaped to have a desired form according to a known shaping method of, for example, mold pressing, cold isostatic pressing, cast molding, injection molding, extrusion molding or the like, and thereafter the shaped compact may be sintered according to a known sintering method, for example, according to various sintering methods of a hot-pressing method, a normal pressure firing method, a vapor pressure firing method, a microwave-heating firing method or the like.

Thus obtained, the alumina sintered compact of the present invention has high hardness and excellent fracture toughness, and is favorable for, for example, grinding, cutting, polishing or the like tools for grinding materials, cutting materials, polishing materials, etc., and further for abrasive grains of heavy grinding stones in steel industry.

[Abrasive Grain]

The abrasive grain of the present invention comprises the alumina sintered compact of the present invention. The alumina sintered compact of the present invention can be obtained through grinding treatment, kneading treatment, shaping treatment, drying treatment and sintering treatment to be attained sequentially.

[Grind Stone]

The grind stone of the present invention has a layer of the abrasive grains of the present invention, as the working face thereof.

As the method of fixing the abrasive grains to the working face of the grind stone of the present invention, there may be mentioned resin bonding, vitrified bonding, metal bonding, electrodeposition, etc.

As the material of the core, there may be mentioned steel, stainless alloys, aluminium alloys, etc.

Resin bonding provides sharp cutting, but is poor in durability. Vitrified bonding provides sharp cutting and is good in abrasion resistance, but gives internal stress to the abrasive grains, whereby the abrasive grains may be often broken or cracked. Electrodeposition gives broad latitude in shape and provides sharp cutting.

In view of the above, the fixation method may be selected in accordance with the use of the grind stone.

Concretely, for example, in a case of a resin-bonded grind stone, there may be employed a method comprising mixing a powder of a binder such as a phenolic resin, a polyimide resin or the like and abrasive grains, or coating abrasive grains with a binder, then filling them in a mold followed by shaping it by pressing, or a method comprising mixing a liquid binder such as an epoxy resin, an unsaturated polyester resin or the like and abrasive grains, then casting them into a mold followed by curing it, whereby there is obtained a grind stone of the present invention that has a layer of abrasive grains fixed on the working face thereof.

Not specifically defined, the shape of the grind stone of the present invention may be suitably selected from a straight type, a cup type or the like in accordance with the use of the grind stone.

EXAMPLES

Next, the present invention is described in more detail with reference to Examples; however, the present invention is not whatsoever limited by these Examples.

The properties in Examples were determined according to the methods mentioned below.

(1) Measurement of Cumulative Mass 50% Diameter ($d_{50}$) of Starting Material Powder:

The cumulative mass 50% diameter ($d_{50}$) of the starting material powder was measured according to a laser diffraction method (with Nikkiso's Microtrack HRA).

(2) Measurement of Mean Vickers Hardness of Alumina Sintered Compact:

As the apparatus, used was Akashi's Model "MVK-VL, Hardness Tester". Regarding the measurement condition, the load was 0.98 N and the indenter application time was 10 seconds. Under the condition, each sample was analyzed on 15 points, and the found data were averaged to give the mean Vickers hardness of the sample. Those having a mean Vickers hardness of at least 16 GPa are free from problem in practical use.

(3) Mean Fracture Toughness Value of Alumina Sintered Compact:

As the apparatus, used was Matsuzawa Seiki's Model "DVK-1". Regarding the measurement condition, the maximum load was 9.81 N, the indenter application speed was 50 μm/sec, and the indenter application time was 15 seconds. Under the condition, each sample was analyzed on 15 points, and the found data were averaged to give the mean fracture toughness value of the sample. The computational formula is given below. Those having a mean fracture toughness value of at least 3.0 MPa·m$^{1/2}$ are free from problem in practical use.

$$K_{IC} = 0.026 \times E^{1/2} \times P^{1/2} \times a/c^{3/2}$$

$K_{IC}$: fracture toughness value (MPa·m$^{1/2}$)
E: Young's modulus (Pa)
P: maximum load (N)
a: indentation size (m)
c: crack size (m)

In the present invention, the Young's modulus E is the value of alumina ($3.9 \times 10^{11}$ Pa).

(4) Measurement of Mean Grain Size in Each Crystal Phase of Alumina Sintered Compact:

As the apparatus, used was JEOL's Model "JSM-6510V" with which SEM pictures were taken. On the SEM pictures, the mean grain size of each crystal phase was measured. The mean grain size was measured as follows: According to a diameter method, the maximum length in the same direction of each grain (50 grains) was measured, and the found data were averaged to give the mean grain size of the sample.

(5) Compositional Analysis of Metal Oxide Crystal Phase Containing Ti, Fe and al of Alumina Sintered Compact:

As the apparatus, used was Panalytical's Model "X'pert PRO". The metal oxide crystal phase was analyzed for the composition thereof under the condition that a CuKα ray was used as the characteristic X ray, the tube voltage was 40 kV and the tube current was 40 mA.

(6) Relative Density:

The relative density was computed by dividing the bulk density of the sintered compact, as measured according to an Archimedian method, by the true density thereof.

In this, it was presumed that all the iron compound and the titanium compound added could react to give $FeTiAlO_5$. With that, the true density of alumina was considered as 3.98 and the true density of $FeTiAlO_5$ was 4.28, and based on the proportion of the formed $FeTiAlO_5$ and the proportion of the remaining alumina, the true density of the sample was computed.

As described above, the form of the starting materials for the sintered compact includes powder, metal power, slurry, aqueous solution, etc. In this Example, from the viewpoint of easy handlability thereof in operation, it was considered that powdery starting materials would be preferred, and therefore powdery starting materials were used. The chemical composition of the alumina power, the ilmenite powder, the silicon oxide (silica) powder, the calcium carbonate powder, the iron oxide powder and the titanium oxide powder (as alumina content, $TiO_2$-equivalent content, $Fe_2O_3$-equivalent content, $SiO_2$-equivalent content, CaO-equivalent content) are shown in Tables 3 to 8 below.

TABLE 3

Chemical Composition of Alumina and Oxide-Equivalent Ingredients in Alumina Powder (% by mass)

| $Al_2O_3$ | $Fe_2O_3$ | $TiO_2$ | $SiO_2$ | CaO |
|---|---|---|---|---|
| 99.36 | 0.02 | <0.01 | 0.01 | <0.01 |

The above alumina powder is Showa Denko's "AL-160SG-3" and the cumulative mass 50% diameter ($d_{50}$) thereof is 0.6 μm.

TABLE 4

Chemical Composition of Alumina and Oxide-Equivalent Ingredients in ilmenite ($FeTiO_3$) Powder (% by mass)

| $Al_2O_3$ | $Fe_2O_3$ | $TiO_2$ | $SiO_2$ | CaO |
|---|---|---|---|---|
| 0.43 | 46.93 | 49.10 | 0.35 | 0.02 |

The above ilmenite powder was from Australia, and was a product by CRL (Consolidated Rutile Limited) in Australia. Before use herein, the powder was ground to have a cumulative mass 50% diameter ($d_{50}$) of 0.75 μm.

TABLE 5

Chemical Composition of Alumina and Oxide-Equivalent Ingredients in Silicon Oxide Powder (% by mass)

| $Al_2O_3$ | $Fe_2O_3$ | $TiO_2$ | $SiO_2$ | CaO |
|---|---|---|---|---|
| 0 | 0 | 0 | 99.91 | 0 |

The above silicon oxide powder is Nippon Aerosil's AEROSIL 200, and its cumulative mass 50% diameter ($d_{50}$) is about 12 μm.

TABLE 6

Chemical Composition of Alumina and Oxide-Equivalent Ingredients in Calcium Carbonate Powder (% by mass)

| $Al_2O_3$ | $Fe_2O_3$ | $TiO_2$ | $SiO_2$ | CaO |
|---|---|---|---|---|
| 0 | 0 | 0 | 0 | 99.5 |

The above calcium carbonate powder is Wako Pure Chemicals' calcium carbonate (special grade chemical), and its cumulative mass 50% diameter ($d_{50}$) is 2.3 μm. In incorporation, the amount to be added was converted in terms of the CaO-equivalent amount thereof.

TABLE 7

Chemical Composition of Alumina and Oxide-Equivalent Ingredients in Iron Oxide ($Fe_2O_3$) Powder (% by mass)

| $Al_2O_3$ | $Fe_2O_3$ | $TiO_2$ | $SiO_2$ | CaO |
|---|---|---|---|---|
| 0.019 | 96.66 | 0.017 | 2.38 | 0.006 |

The above iron oxide powder is Tone Sangyo's red iron oxide, SR-570, and its cumulative mass 50% diameter ($d_{50}$) is 0.5 μm.

TABLE 8

Chemical Composition of Alumina and Oxide-Equivalent Ingredients in titanium oxide ($TiO_2$) Powder (% by mass)

| $Al_2O_3$ | $Fe_2O_3$ | $TiO_2$ | $SiO_2$ | CaO |
|---|---|---|---|---|
| 0.057 | 0 | 99.22 | 0 | 0.0011 |

The above titanium oxide powder is Showa Titanium's "Super Titania®G Series", and its cumulative mass 50% diameter ($d_{50}$) is 0.6 μm.

Examples 1 to 11 and Comparative Examples 1 to 7

The above alumina powder having a cumulative mass 50% diameter ($d_{50}$) of 0.6 μm and the above ilmenite powder having a cumulative mass 50% diameter ($d_{50}$) of 0.75 μm were mixed in such a manner that the $TiO_2$ content and the $Fe_2O_3$ content in the alumina sintered compact to be formed could be as in Table 9-1 and 9-2, thereby preparing various mixtures.

300 g of an aqueous solution containing 5% by mass of polyvinyl alcohol and 600 g of pure water were added to each mixture, ground and mixed in a ball mill (for 4 hours in Examples 1 to 5 and Comparative Examples 1 to 6, but for 8 hours in others), thereby preparing various types of homogeneous slurries each having a mixture concentration of about 25% by mass.

Next, each slurry was dried at 120° C. for 24 hours, and then ground in a mortar to give a ground powder having a cumulative mass 50% diameter ($d_{50}$) of at most 300 μm. Each ground powder was molded in a mold under a pressure of 100 MPa, and then further processed for hydrostatic pressurization under a pressure of 150 MPa to give various types of molded compacts.

Subsequently, each molded compact was fired in an electric furnace (air atmosphere) for 4 hours so as to have a relative density of at least 95%, thereby giving various alumina sintered compacts. These were tested (evaluated) as above. The results are shown in Table 9-1 and 9-2 below.

FIG. 2 shows SEM pictures of the alumina sintered compact of Example 3 before and after impact test; FIG. 4 shows SEM pictures of the alumina sintered compact of Comparative Example 1 before and after impact test. In these drawings, (A) shows the condition of the crystalline structure before impact test, and (B) shows the condition of crack propagation after impact test.

Examples 12 and 13 and Comparative Examples 8 and 9

The above alumina powder having a cumulative mass 50% diameter ($d_{50}$) of 0.6 μm, the above iron oxide powder having a cumulative mass 50% diameter ($d_{50}$) of 0.5 μm and the above titanium oxide powder having a cumulative mass 50% diameter ($d_{50}$) of 0.6 μm were mixed in such a manner that the $TiO_2$ content and the $Fe_2O_3$ content in the alumina sintered compact to be formed could be as in Table 9-1 and 9-2, thereby preparing various mixtures.

300 g of an aqueous solution containing 5% by mass of polyvinyl alcohol and 600 g of pure water were added to each mixture, ground and mixed in a ball mill (processing time; 4 hours), thereby preparing various types of homogeneous slurries each having a mixture concentration of about 25% by mass.

Next, each slurry was dried at 120° C. for 24 hours, and then ground in a mortar to give a ground powder having a cumulative mass 50% diameter ($d_{50}$) of at most 300 μm. Each ground powder was molded in a mold under a pressure of 100 MPa, and then further processed for hydrostatic pressurization under a pressure of 150 MPa to give various types of molded compacts.

Next, each molded compact was fired in an electric furnace (air atmosphere) for 4 hours so as to have a relative density of at least 95%, thereby giving various alumina sintered compacts. These were tested (evaluated) as above. The results are shown in Table 9-1 and 9-2 below.

TABLE 9-1

| | Composition of Sintered Compact (% by mass), balance $Al_2O_3$ | | | | Physical Properties of Sintered Compact | | | | |
|---|---|---|---|---|---|---|---|---|---|
| | $Fe_2O_3$ | $TiO_2$ | $SiO_2$ | CaO | Relative Density (%) | Mean Vickers Hardness (GPa) | Mean Fracture Toughness Value (MPa·m$^{1/2}$) | $FeTiAlO_5$ mean grain size (μm) | Presence or Absence of $FeTiAlO_5$ |
| Example 1 | 2.45 | 2.56 | 0.02 | 0.00 | 95.8 | 16.7 | 3.0 | 3.4 | present |
| Example 2 | 3.41 | 3.57 | 0.03 | 0.00 | 96.7 | 16.5 | 3.4 | 3.7 | present |
| Example 3 | 3.89 | 4.07 | 0.03 | 0.00 | 96.7 | 16.4 | 3.9 | 3.9 | present |
| Example 4 | 4.38 | 4.58 | 0.03 | 0.00 | 96.9 | 16.3 | 3.6 | 4.1 | present |
| Example 5 | 4.87 | 5.09 | 0.04 | 0.00 | 97.3 | 16.1 | 3.4 | 4.2 | present |
| Example 6 | 2.45 | 2.56 | 0.33 | 0.66 | 95.7 | 16.4 | 3.8 | 4.3 | present |
| Example 7 | 2.45 | 2.56 | 0.66 | 1.32 | 95.9 | 16.3 | 3.7 | 4.5 | present |
| Example 8 | 3.89 | 4.07 | 0.33 | 0.66 | 95.5 | 16.1 | 4.0 | 5.6 | present |
| Example 9 | 3.89 | 4.07 | 0.66 | 1.32 | 96.6 | 16.0 | 3.8 | 5.7 | present |
| Example 10 | 4.87 | 5.09 | 0.33 | 0.66 | 97.0 | 16.0 | 3.8 | 5.8 | present |
| Example 11 | 4.87 | 5.09 | 0.66 | 1.32 | 96.8 | 16.0 | 3.6 | 6.2 | present |
| Example 12 | 4.60 | 3.40 | 0.11 | 0.00 | 97.5 | 16.2 | 3.6 | 3.7 | present |
| Example 13 | 3.40 | 4.60 | 0.08 | 0.00 | 96.8 | 16.1 | 3.5 | 3.8 | present |

TABLE 9-2

| | Composition of Sintered Compact (% by mass), balance $Al_2O_3$ | | | | Physical Properties of Sintered Compact | | | | |
|---|---|---|---|---|---|---|---|---|---|
| | $Fe_2O_3$ | $TiO_2$ | $SiO_2$ | CaO | Relative Density (%) | Mean Vickers Hardness (GPa) | Mean Fracture Toughness Value (MPa·m$^{1/2}$) | $FeTiAlO_5$ mean grain size (μm) | Presence or Absence of $FeTiAlO_5$ |
| Comparative Example 1 | 0.01 | 0.00 | 0.01 | 0.00 | 96.6 | 17.4 | 2.4 | — | absent |
| Comparative Example 2 | 0.05 | 0.05 | 0.01 | 0.00 | 96.6 | 17.3 | 2.4 | — | absent |
| Comparative Example 3 | 0.49 | 0.51 | 0.01 | 0.00 | 96.3 | 17.1 | 2.5 | 3.0 | present |
| Comparative Example 4 | 1.46 | 1.53 | 0.01 | 0.00 | 95.1 | 16.8 | 2.6 | 3.2 | present |
| Comparative Example 5 | 7.30 | 7.64 | 0.05 | 0.00 | 97.5 | 15.6 | 2.8 | 7.2 | present |
| Comparative Example 6 | 9.74 | 10.2 | 0.07 | 0.00 | 97.0 | 13.8 | 2.7 | 8.3 | present |
| Comparative Example 7 | 7.30 | 7.64 | 0.33 | 0.66 | 95.9 | 15.0 | 3.0 | 7.5 | present |

TABLE 9-2-continued

| | Composition of Sintered Compact (% by mass), balance Al$_2$O$_3$ | | | | Physical Properties of Sintered Compact | | | | |
|---|---|---|---|---|---|---|---|---|---|
| | Fe$_2$O$_3$ | TiO$_2$ | SiO$_2$ | CaO | Relative Density (%) | Mean Vickers Hardness (GPa) | Mean Fracture Toughness Value (MPa·m$^{1/2}$) | FeTiAlO$_5$ mean grain size (μm) | Presence or Absence of FeTiAlO$_5$ |
| Comparative Example 8 | 4.80 | 3.20 | 0.12 | 0.00 | 97.0 | 15.3 | 2.9 | 3.2 | present |
| Comparative Example 9 | 3.20 | 4.80 | 0.08 | 0.00 | 96.3 | 15.4 | 2.9 | 3.3 | present |

It has been confirmed through X-ray diffractiometry that, in the alumina sintered compacts of Examples 1 to 13 and Comparative Examples 3 to 9, the metal oxide crystal phase containing Ti, Fe and Al and existing in the grain boundary of the main crystal phase composed of a corundum crystal is a crystal phase comprising FeTiAlO$_5$.

Figure 5:
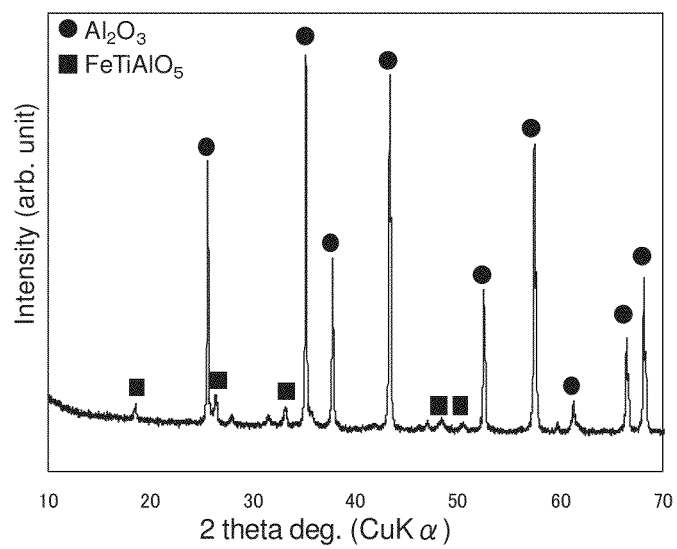
FIG. 5 This is an X-ray diffraction pattern showing the result of compositional analysis (X-ray diffractiometry) of the alumina sintered compact of Example 7.

FIG. 5 shows the results of X-ray diffractiometry of the alumina sintered compact of Example 7.

For the data analysis in X-ray diffractiometry, used was PANalytical's analysis software, "X'Pert High Score Plus".

Using the analysis software, the crystal structure of FeTiAlO$_5$ was confirmed on the basis of the literature announced by Tiedemann et al. in 1982.

The pattern obtained through the analysis was compared with the result of the experimental sample, and the peak was determined to be caused by FeTiAlO$_5$.

DESCRIPTION OF REFERENCE NUMERALS AND SIGNS

10: FeTiAlO$_5$ Grains
12: Alumina Grains
X: Arrow Indicating the Crack Running Direction
Y: Arrow Indicating the Crack Running Direction

The invention claimed is:

1. An alumina sintered compact containing a titanium compound and an iron compound, wherein FeTiAlO$_5$ grains exist in the grain boundary of the alumina grains and the mean grain size of the FeTiAlO$_5$ grains is from 3.4 to 7.0 μm, wherein the total amount of TiO$_2$-equivalent content of the titanium compound and the Fe$_2$O$_3$-equivalent content of the iron compound is from 5 to 13% by mass; and the ratio by mass of the TiO$_2$-equivalent content to the Fe$_2$O$_3$-equivalent content (TiO$_2$:Fe$_2$O$_3$) is from 0.85:1.15 to 1.15:0.85.

2. An abrasive grain comprising the alumina sintered compact of claim 1.

3. A grind stone having a layer of the abrasive grains of claim 2 as the working face thereof.

* * * * *